March 14, 1933.  J. S. VICKERS  1,901,210
ANIMAL TRAP
Filed June 2, 1931  2 Sheets-Sheet 1

Inventor
J. S. Vickers.
By Clarence A. O'Brien
Attorney

March 14, 1933.  J. S. VICKERS  1,901,210
ANIMAL TRAP
Filed June 2, 1931  2 Sheets-Sheet 2
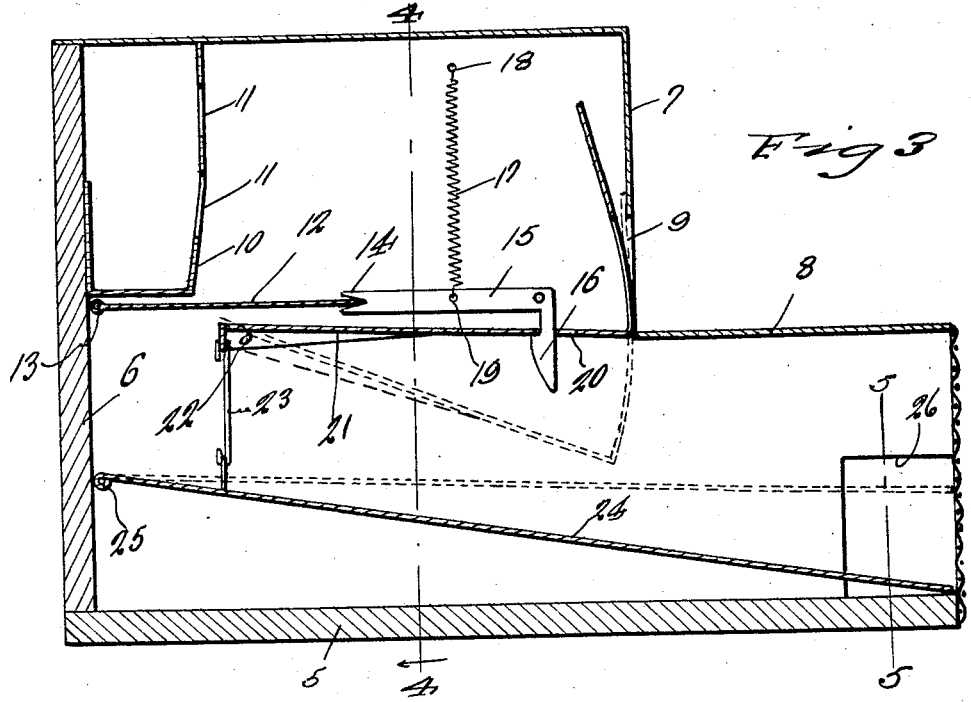
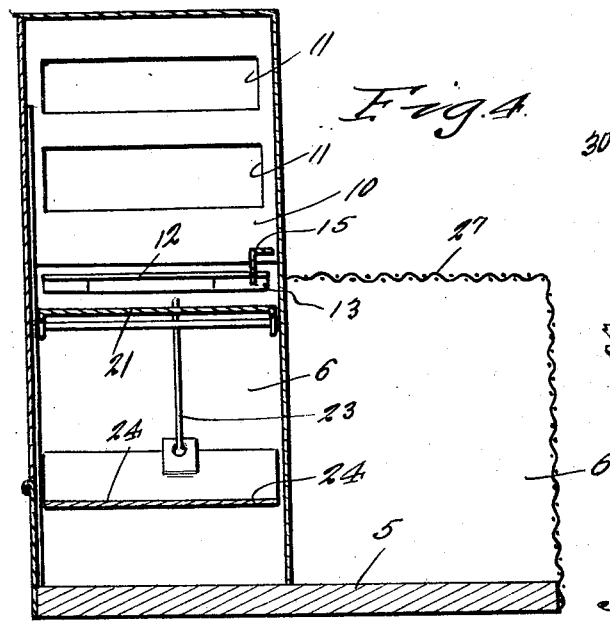
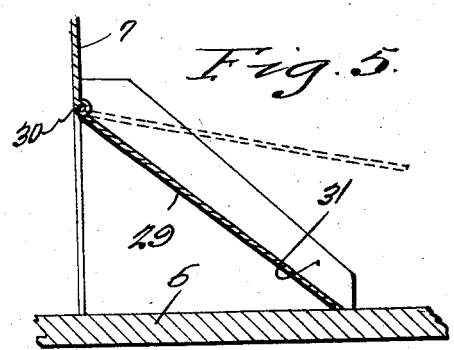
Inventor
J. S. Vickers
By Clarence A. O'Brien
Attorney Patented Mar. 14, 1933

1,901,210

UNITED STATES PATENT OFFICE

JAMES S. VICKERS, OF ALEXANDER CITY, ALABAMA

ANIMAL TRAP

Application filed June 2, 1931. Serial No. 541,672.

This invention relates to new and useful improvements in animal traps, and more particularly to a trap of the resetting type.

The principal object of this invention is to provide a animal trap wherein the caught animal in moving about resets the trap.

Another important object of the invention is to provide a trap of such construction that its parts will be positive-acting and efficient in operation.

Other important objects and advantages of the invention will become apparent to the reader of the following specification and claims.

In the drawings:—

Fig. 3 represents a longitudinal sectional view taken substantially on the line 3—3 of Fig. 2.

Fig. 4 represents a transverse sectional view taken substantially on the line 4—4 of Fig. 3.

Fig. 5 represents a fragmentary detailed sectional view taken substantially on the line 5—5 of Fig. 3.

Figure 1:
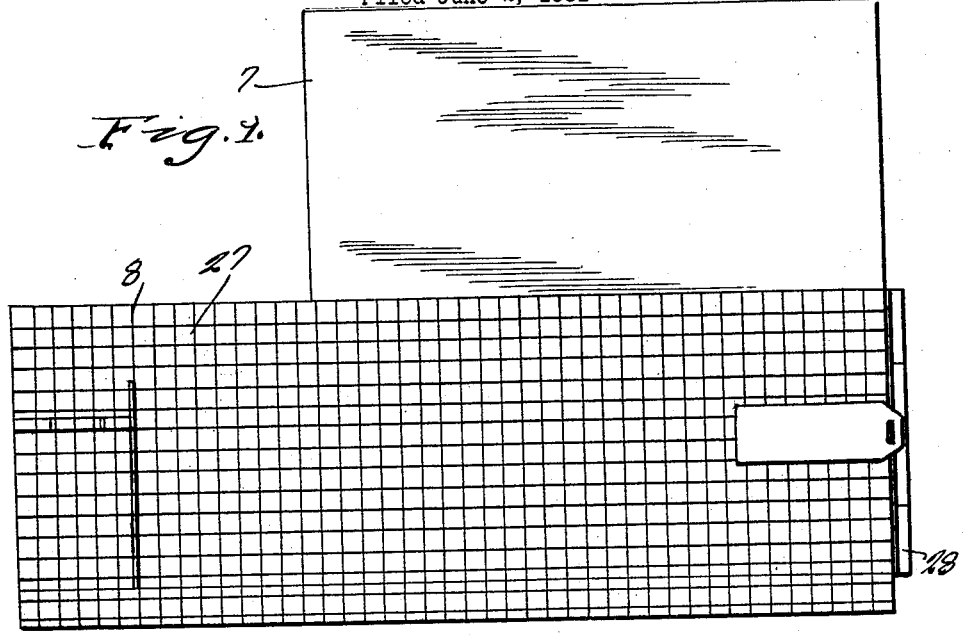
Figure 1 represents a side elevational view of the novel trap.

Referring to the drawings wherein like numerals designate like parts, it can be seen in the drawings that (Fig. 3) the strap structure includes a base 5 and one end wall 6 of substantially L-shape.

Mounted upon the base 5 and extending upwardly to a plane on a level with the top of the end wall 6 is the housing 7, which at one end is connected to the end wall 6, while at its opposite end a low extension 8 is provided. The end of the housing 7 at the inner end of the extension 8 is provided with an entrance opening 9, while at the upper interior of the housing 7 adjacent the wall 6 is the trough 10, in the inner wall of which is provided with openings 11 through which the animal may nose at the bait in the trough. This trough 10 is located immediately above the pedal 12 which has one end pivotally connected to the housing 7 as at 13.

The opposite end of the pedal 12 normally engages into the notched end 14 of the rockable trigger 15, which is provided with a depending head 16 at the end thereof adjacent the entrance opening 9. A light coiled spring 17 has one end thereof secured to the housing 7 as at 18 while its opposite end is connected to the intermediate portion of the trigger 15 as at 19. The head 16 engages through an opening 20 in the plate 21, which is rockably supported as at 22 to normally support the plate in set position. The head 16 engages with edge portion the plate portion 21 at the opening 20 to sustain the plate 21 in the position shown in Fig. 3; when no weight is imposed on the pedal 12.

A link connection 23 is provided between the plate 21 and the swingable platform 24, which is hingedly connected as at 25 to the housing 7 at the portion thereof adjacent the wall 6, while the free end thereof swings in a path registering with the opening 26 in the side of the housing 7 of the extension 8 which divides the interior of the housing 7 from the cage 27.

Figure 2:
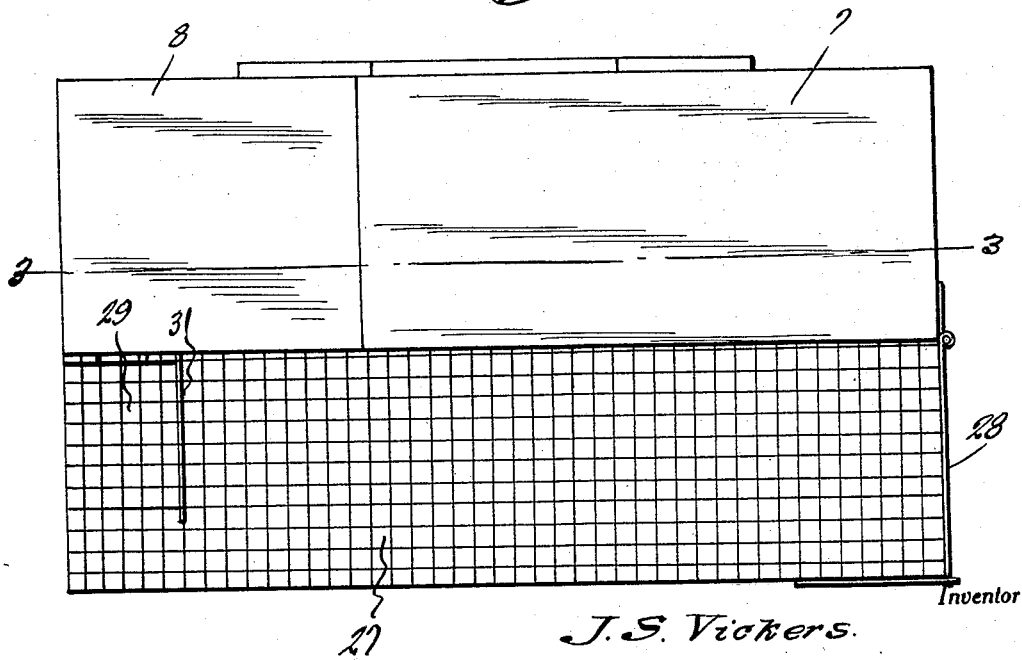
Fig. 2 represents a side elevational view of the novel trap.

This cage 27 is located on the platform 5 at one side of the housing as is clearly shown in Figs. 2 and 4. A door 28 is provided at one end of the cage 27 so that the animals can be removed from the cage.

It can also be seen that a closure 29 hingedly connects to the wall between the housing 7 and the cage 27, as at 30, is substantially longer than the height of the opening 26 so that the same will normally lean in the position shown in Fig. 5.

In operation, the animal enters the housing 7 through the opening 9 and walks upon the plate 21 until he reaches the pedal 12. In endeavoring to reach the bait (not shown) in the trough 10, the animal steps upon the pedal 12. In view of the weak resistance of the spring 17, the trigger 15 will rock at its heel portion, due to the superimposed weight of the animal upon the pedal 12, the pedal 12 being swingable at its end 13. This motion of the trigger 15 will obviously release the plate 21 and the animal in attempting to escape will find itself on the lowering plate 21, which gravitates under the weight of the animal. Due to the link connection 23 between the plate 21 and the platform 24, the platform 24 will be elevated to the dotted line position shown in Fig. 3, when the plate 21 has reached its lowermost position, as is also shown in dotted lines in Fig. 3.

Obviously, when the animal steps off or slides off of the plate 21 onto the platform 24, its weight will be imposed upon the platform 24, which will cause the downward movement of the platform 24, while the plate 21 is swung upwardly to the full line position shown in Fig. 3 due to the inverse motion of the linked connection 23. Thus, the trap is re-set and the animal on the platform 24 is free to pass through the opening 26 and into the cage 27. The animal of course, pushes under the hinged closure 29 which returns to the position shown in Fig. 5 to prevent the return of the animal back into the housing 7.

It will also be observed, that in the automatic re-setting of the device, as the plate 21 is returned to its horizontal position by the action of the platform 24 and link 23, the head 16 of the trigger 15 is in position to again catch the plate 21 through the opening 20 to support the same until it is again released by the weight of an animal on the pedal 12.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A trap of the character described comprising a housing, a cage adjacent the housing, a tiltable plate mounted within the housing, a pedal swingably supported within the housing, said plate being provided with an opening therein, and located beneath the pedal, a rockable trigger, said trigger being provided with a head engageable through the opening to support the plate in a horizontal position, and being engageable at its opposite end with the pedal, said trigger being rockable by the said pedal when a weight is imposed thereon releasing the plate so that an animal will drop into the bottom of the housing and subsequently pass into the cage.

2. A trap of the character described comprising a housing, a cage communicating with the housing, a rockable plate mounted in the housing, a pedal located above the plate, a trigger interposed between the pedal and the plate, so that when weight is imposed on the pedal, the plate will be released so that an animal will fall into the bottom portion of the housing, means on the plate for preventing the escape of an animal from the housing when the plate is in lowered position, a swingable platform mounted within the lower portion of the housing, and a link connection between the platform and one end of the said plate.

In testimony whereof I affix my signature.
JAMES S. VICKERS.